UNITED STATES PATENT OFFICE.

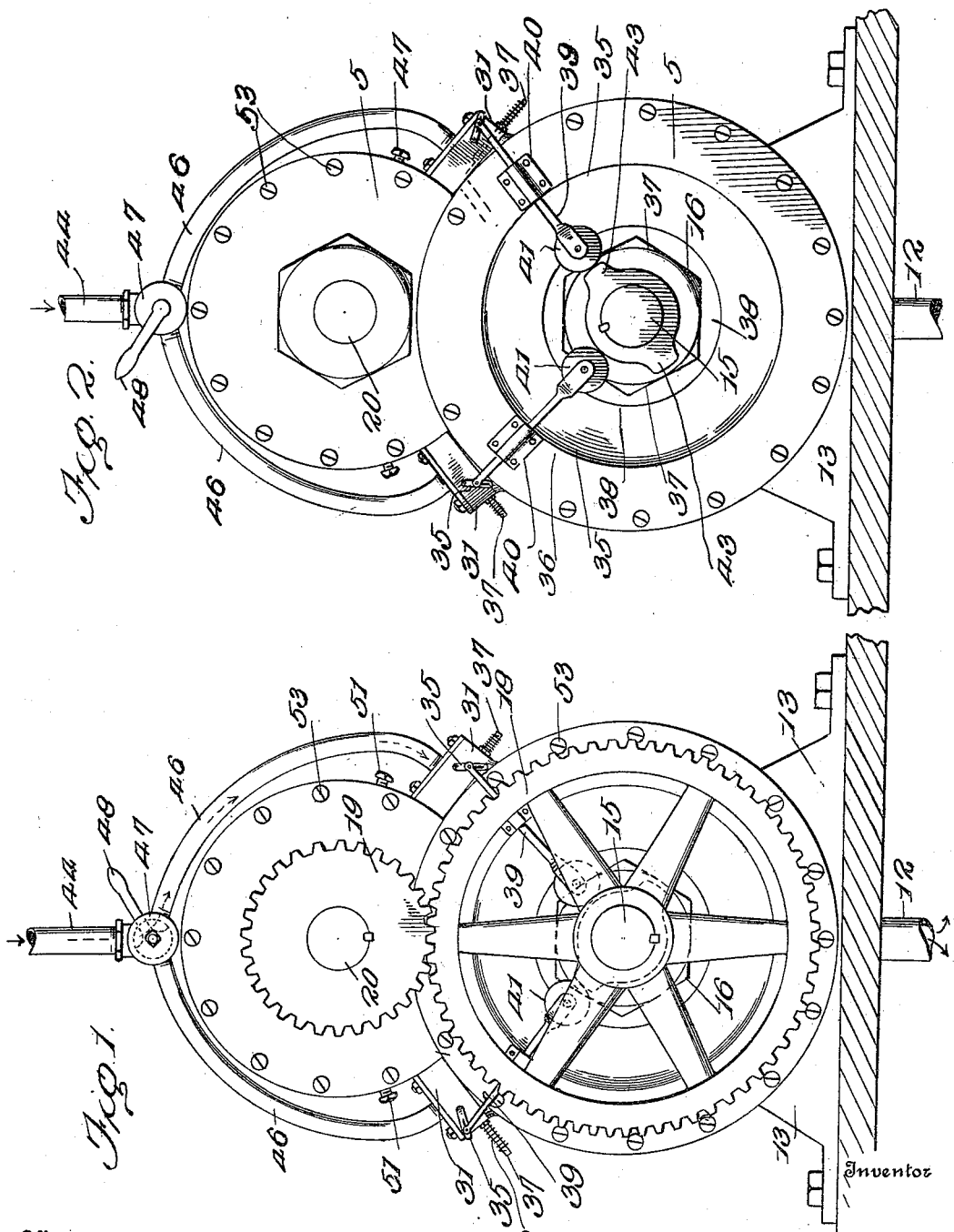

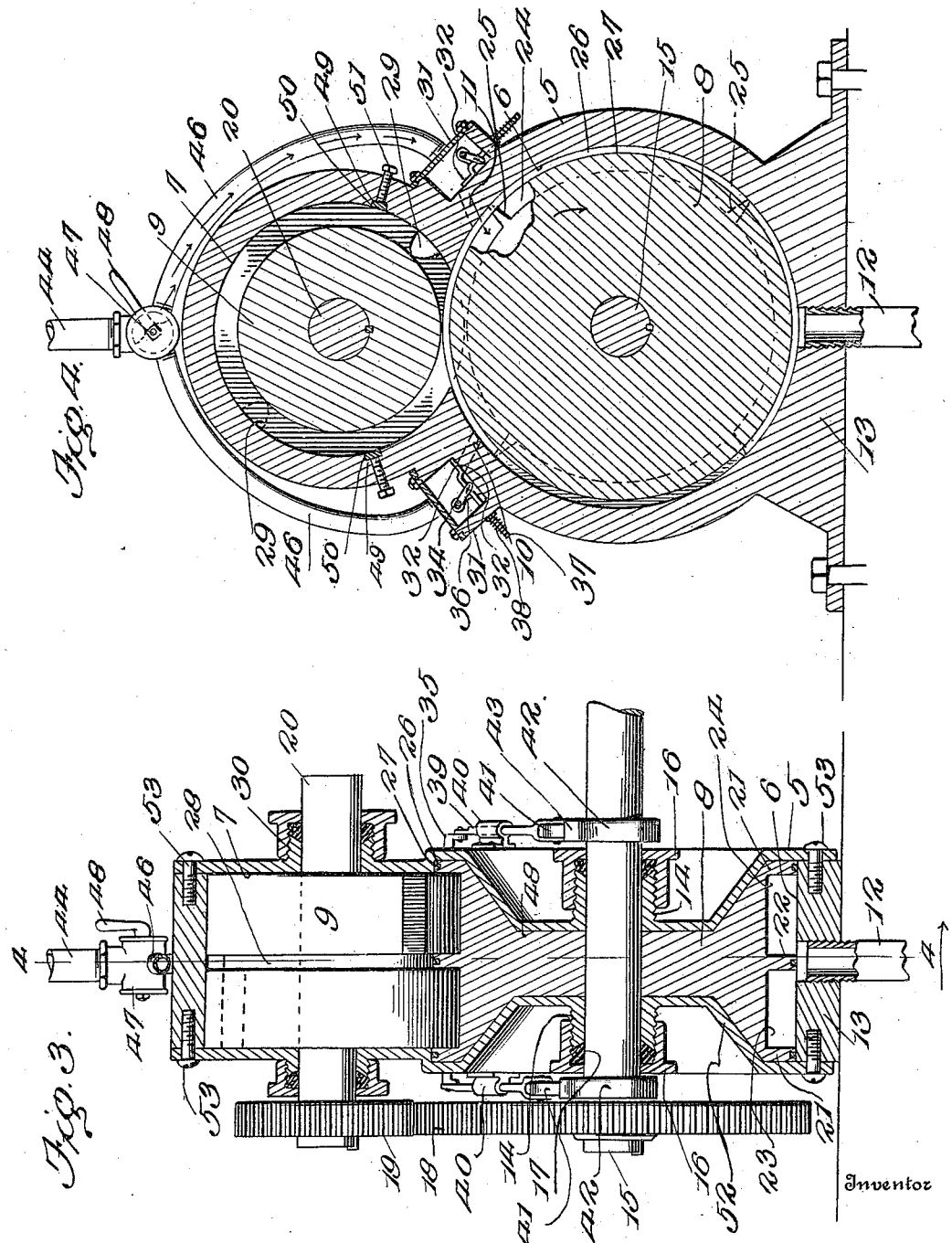

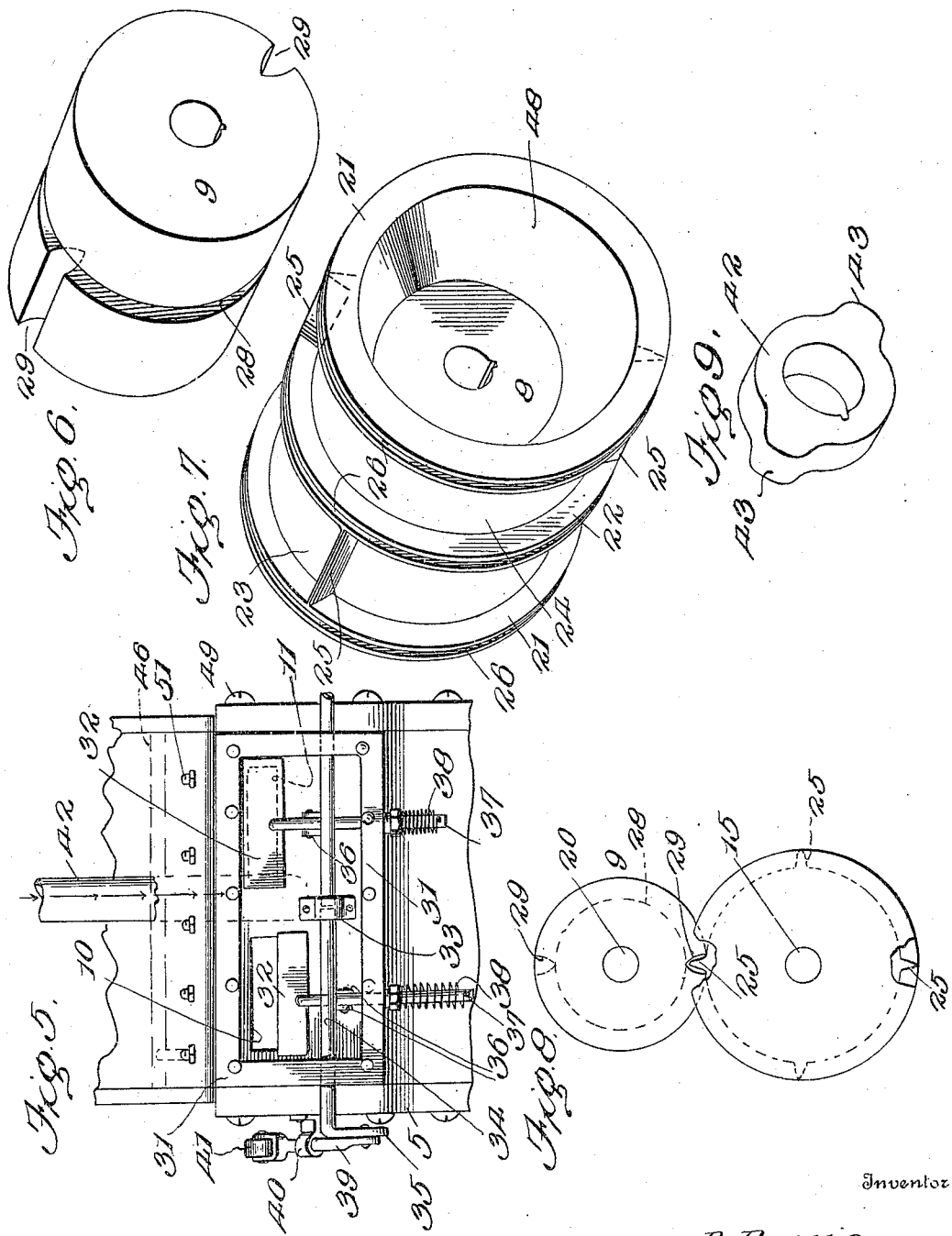

BERT DORRIS, OF BLOOMFIELD, INDIANA.

ROTARY ENGINE.

960,516.  Specification of Letters Patent.  Patented June 7, 1910.

Application filed July 21, 1909. Serial No. 508,828.

*To all whom it may concern:*

Be it known that I, BERT DORRIS, citizen of the United States, residing at Bloomfield, in the county of Greene and State of Indiana, have invented certain new and useful Improvements in Rotary Engines, of which the following is a specification.

This invention relates to rotary engines and has for its object to effect improvements in this class of engines whereby their efficiency is materially increased and the cost of construction reduced to a minimum.

A further object is to provide an engine, the cylinder or rotor of which is provided with a circumferential flange forming independent steam pockets, each of which are provided with a pair of pistons, the piston of one pocket being disposed intermediate the piston of the other pocket so that steam will be admitted to said pockets at each quarter revolution of the cylinder and thus continuously drive the same and prevent the cylinder from stopping on dead center.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a side elevation of a rotary engine constructed in accordance with my invention; Fig. 2 is a similar view looking at the opposite side of the engine; Fig. 3 is a vertical transverse sectional view; Fig. 4 is a vertical longitudinal sectional view; Fig. 5 is a top plan view of one of the steam chests of the adjacent portion of the casing; Fig. 6 is a perspective view of the abutment detached; Fig. 7 is a similar view of the cylinder or rotor detached; Fig. 8 is a side elevation showing the engagement between the abutment and the fixed pistons of the rotor; Fig. 9 is a perspective view of the cam detached from the driving shaft.

Corresponding and like parts are referred to in the following description and indicated in all the views of the drawings by the same reference characters.

The engine comprises a casing or housing 5 provided with communicating chambers 6 and 7, in one of which is mounted a rotor 8 and in the other an abutment 9, there being oppositely disposed inlet ports 10 and 11 formed in the opposite sides of the casing and communicating with the chamber 6, and an exhaust port 12 formed in the base 13 and also communicating with the chamber 6, as shown.

Extending transversely through the chamber 6 and mounted for rotation in suitable bearings 14, is a main driving shaft 15 to which is keyed or otherwise fixed the rotor 8.

The exterior walls of the bearings 14 are threaded for engagement with suitable caps 16, the latter being provided with a packing 17 so as to form a gland and thus effectually prevent leakage and also to reduce friction between the parts.

Keyed or otherwise rigidly secured to the shaft 15 is a master gear 18 which meshes with a pinion 19 carried by a transverse shaft 20, the latter being secured to and mounted for rotation with the abutment 9.

The cylinder or rotor 8 is provided with spaced outer circumferential flanges 21 and an intermediate circumferential flange 22, the latter dividing the peripheral face of the rotor into independent pockets 23 and 24 adapted to receive steam from the inlet ports 10 and 11.

Each steam receiving pocket is provided with spaced oppositely disposed transverse partitions 25 constituting in effect stationary pistons, the pistons 25 of the pocket 23 being disposed intermediate the pistons 25 of the pocket 24 so that said pockets will take steam at each quarter revolution of the cylinder, and thus continuously drive the latter and prevent the same from stopping on dead center.

The peripheral edges of the outer and intermediate flanges 21 and 22 respectively, are formed with grooves 26 in which are seated suitable packing strips 27, the latter being either secured to the interior of the casing or arranged to rotate with the cylinder, as desired, thus to reduce friction between the parts to a minimum and effectually prevent leakage of steam or other actuating fluid. It is preferred however, to have the packing strips 27 fastened in any suitable manner to the casing and the grooved flanges to revolve around said packing strips.

It will here be noted that the outer flanges 21 of the rotor, by engagement with the opposite faces of the abutment, serve to maintain the latter in operative relation to the rotor and prevent side wabbling of the same.

The abutment 9 is formed with a centrally disposed circumferential groove 28 adapted to receive the intermediate flange 22 of the rotor, the abutment on each side of the central groove 28 being provided with pockets or recesses 29 adapted to receive and accommodate the pistons 25 as the cylinder revolves.

The casing 5 on opposite sides of the abutment 9 is extended laterally to form bearings 30 for engagement with suitable caps so as to produce glands similar in construction to the glands 17.

Disposed on opposite sides of the casing at the inlet ports 10 and 11, are valve chests 31 in which are mounted for reciprocation independently movable valves 32, said valves being actuated to alternately admit steam to the pockets 23 and 24, thereby to continuously rotate the cylinder.

It will of course be understood that a pair of inlet ports are arranged on each side of the casing and that the valves 32 are timed to alternately open and close the inlet ports of the adjacent steam chest.

Journaled in suitable bearings 33 are independent rock shafts 34 each having its outer end bent to form a crank arm 35 and its intermediate portion provided with spaced laterally extending fingers 36 between which is pivotally mounted the stem 37 of the adjacent valve. The free end of each valve stem 37 is projected beyond the exterior wall of the adjacent steam chest to form a support for a coiled spring 38, which latter serves to normally and yieldably return the valves to closed position.

Pivotally connected with the crank arm of each rock shaft 34 is a trip lever 39 having its intermediate portion slidably mounted in a guide loop or keeper 40 and its lower end bifurcated to accommodate a roller or tappet 41, the latter being disposed in the path of movement of an actuating member or cam 42 mounted on the shaft 5, as shown.

Each actuating member is provided with a pair of oppositely disposed projections or cams 43, the projections or cams 43 on one side of the engine being disposed diametrically opposite the projections or cams on the other side of said engine so as to actuate the valves at every quarter revolution of the cylinder or rotor. Thus it will be seen that the valves 32 are opened positively and automatically closed by the action of the coiled springs 38.

Disposed at the upper end of the casing is a steam supply pipe 44 having branch pipes 46 communicating therewith and also communicating with the adjacent steam chests 31, there being a two-way valve 47 disposed in the main pipe 44 for directing the steam through the branch pipes 46 to either steam chest. Thus it will be seen that by moving the operating handle 48 of the valve 43 in one direction, steam will be admitted to the inlet ports on one side of the casing to drive the rotor or cylinder in the direction of the arrow, indicated in Fig. 4 of the drawings, and when the handle 48 is moved in the other direction, steam is admitted through the other branch pipe to the adjacent steam chest, thus reversing the engine.

It will also be noted that as the piston 25 in the pocket 24, passes one of the inlet ports 11, steam will be admitted through said ports to the pocket, while the other port 11 will be closed, the expansion of the steam in the pocket 24 causing the cylinder to rotate until the piston 25 in the pocket 23 registers with the adjacent inlet port when steam will be admitted to the pocket 23 and rotate the cylinder, this operation being continued, and steam admitted to the pockets 23 and 24 at each quarter revolution of the cylinder and exhausted through the pipe 12.

In order to prevent leakage around the abutment 9, the interior walls of the chamber 7 are provided with transverse seating grooves 49 in which are seated packing strips 50 adapted to bear against the exterior circumferential face of the abutment 9, the pressure exerted by the strips on the abutment 9 being regulated by suitable screws 51 extended through the walls of the casing, as shown.

In order to reduce the weight of the engine, the opposite walls of the rotor or cylinder 8 are cut-away, as indicated at 52, while the casing 5 is bent inwardly to conform to the adjacent sides of the rotor.

It is preferred to form the casing 5 in three sections, the side sections of said casing being detachably secured to the intermediate section by screws or similar fastening devices 53 so as to permit either of the side sections to be detached when it is desired to obtain access to the cylinder or abutment to effect any necessary repairs to the same.

Having thus described the invention, what is claimed as new is:

1. A rotary engine including a casing having inlet and exhaust ports, a rotor disposed within the casing and provided with spaced circumferential flanges defining independent pockets, there being circumferential grooves formed in the flanges for the reception of a packing, partitions extending across the pockets and constituting fixed pistons, an abutment mounted for rotation in the casing and provided with recesses to permit the passage of the pistons, valves disposed on opposite sides of the casing for controlling the admission of steam to the inlet ports and main supply pipe, and means for directing steam to either valve, thereby to control the direction of rotation of the rotor.

2. A rotary engine including a casing having inlet and exhaust ports and provided with spaced laterally extending bearings, shafts journaled in said bearings, caps engaging the exterior walls of the bearings and constituting glands, a rotor keyed to one of the shafts and having its opposite side walls cut-away and its periphery formed with a plurality of spaced flanges defining independent pockets, transverse partitions extending across said pockets and constituting pistons, an abutment mounted for rotation with the other shaft and bearing against the outer flanges of the rotor, said abutment being provided with a central circumferential groove for the reception of the central flange of the rotor and having recesses formed therein to permit the passage of the pistons, intermeshing gears carried by said shafts for transmitting motion from one to the other, valves mounted for reciprocation on the casing, and means engaging the valves and actuated by the shaft of the rotor for controlling the admission of steam to the pockets at each quarter revolution of the rotor.

3. A rotary engine including a casing having inlet and exhaust ports, spaced shafts journaled in the casing, a rotor secured to one of the shafts and provided with spaced outer and intermediate circumferential flanges defining independent pockets, partitions extending across the pockets and constituting fixed pistons, an abutment mounted for rotation with the other shaft and having its opposite edges bearing against the inner faces of the outer flanges of the rotor and its intermediate portion provided with a circumferential groove for the reception of the central flange of said rotor, there being transverse recesses formed in the abutment on opposite sides of the central groove and disposed diametrically opposite each other to permit the passage of the pistons, the pistons in one pocket being arranged intermediate the pistons in the other pocket, and a valve for controlling the admission of steam alternately to said pockets at each quarter revolution of the rotor.

4. A rotary engine including a casing having steam chests and provided with inlet and exhaust ports, a rotor provided with spaced pockets, an abutment co-acting with the rotor, rock shafts journaled in the steam chests and provided with terminal crank arms, spring pressed valves operatively connected with the rock shafts, cams carried by the shaft of the rotor, and trip levers pivotally connected with the crank arms of the rock shafts and extended into the path of movement of the cams.

5. A rotary engine including a casing having steam chests and provided with inlet and exhaust ports, a shaft journaled in the casing, a rotor secured to the shaft and provided with spaced pockets, an abutment co-acting with the rotor, rock shafts journaled in the steam chests and having their intermediate portions provided with spaced fingers and their terminals formed with crank arms, spring pressed valves slidably mounted in the steam chests and provided with stems pivotally mounted between the fingers of the adjacent rock shafts, cams secured to the shaft of the rotor, and trip levers connected with the crank arms and extended into the path of movement of the cams.

6. A rotary engine including a casing having steam chests and provided with inlet and exhaust ports, a shaft mounted for rotation in the casing, a rotor secured to the shaft, an abutment co-acting with the rotor, independent rock shafts journaled in the steam chests and provided with crank arms, actuating members secured to the shaft of the rotor on opposite sides of the engine and provided with oppositely disposed projections, the projections of the actuating member on one side of the engine being disposed diametrically opposite the projections of the actuating member on the other side of the engine, and trip levers connected with the crank arms and disposed in the path of movement of the projections on the adjacent actuating members.

7. A rotary engine including a casing having steam chests and provided with inlet and exhaust ports, a shaft journaled in the casing, a rotor secured to the shaft and provided with spaced pockets, an abutment co-acting with the rotor, independent rock shafts journaled in the steam chests and having their intermediate portions provided with spaced laterally extending fingers and their terminals formed with crank arms, valves slidably mounted in the steam chests and provided with stems pivotally mounted between the fingers of the adjacent rock shafts, the free ends of the stems being extended through the wall of the steam chests, coil springs surrounding the projecting ends of the stems for normally holding the valves in closed position, actuating members secured to the shaft of the rotor on opposite sides of the engine and provided with spaced projections, keepers secured to the casing, and trip levers slidably mounted in the keepers and having their upper ends pivotally connected with the adjacent crank arms and their lower ends provided with tappets for engagement with the adjacent actuating members.

In testimony whereof I affix my signature in presence of two witnesses.

BERT DORRIS. [L. S.]

Witnesses:
CELESTUS GOODWIN,
GUY H. HUMPHREYS.